US012138644B2

(12) United States Patent
Moretti

(10) Patent No.: US 12,138,644 B2
(45) Date of Patent: Nov. 12, 2024

(54) DEVICE FOR CONTAINING AND DISPENSING FLUID SUBSTANCES

(71) Applicant: LUMSON S.P.A., Capergnanica (IT)

(72) Inventor: Matteo Moretti, Crema (IT)

(73) Assignee: LUMSON S.P.A., Crema (IT)

( * ) Notice: Subject to any disclaimer, the term of this patent is extended or adjusted under 35 U.S.C. 154(b) by 230 days.

(21) Appl. No.: 17/860,512

(22) Filed: Jul. 8, 2022

(65) Prior Publication Data

US 2023/0008418 A1 Jan. 12, 2023

(30) Foreign Application Priority Data

Jul. 9, 2021 (IT) ........................ 102021000018110

(51) Int. Cl.

*B05B 11/00* (2023.01)
*B05B 11/02* (2023.01)
*B05B 11/10* (2023.01)

(52) U.S. Cl.

CPC ...... *B05B 11/1047* (2023.01); *B05B 11/0038* (2018.08); *B05B 11/026* (2023.01)

(58) Field of Classification Search

CPC ............. B05B 11/1047; B05B 11/0038; B05B 11/026; B05B 11/0032; B65D 25/02
See application file for complete search history.

(56) References Cited

U.S. PATENT DOCUMENTS 10,717,098 B2 * 7/2020 Delmon ................ B05B 11/026
11,471,903 B2 * 10/2022 El Hassain ......... B05B 11/0038
2002/0111363 A1 * 8/2002 Drechsel .............. A61K 9/0078 514/291
2004/0112921 A1 6/2004 Nomoto et al.
2011/0024452 A1 2/2011 Moretti
2017/0000237 A1 * 1/2017 Lefevre .................. A45D 34/00

FOREIGN PATENT DOCUMENTS

EP 2243557 B1 4/2015
EP 3037174 A1 6/2016
JP 5031790 B2 9/2012
JP 5031791 B2 9/2012
WO 2020115399 A1 6/2020

* cited by examiner

*Primary Examiner* — Vishal Pancholi
(74) *Attorney, Agent, or Firm* — Dickinson Wright PLLC; Andrew D. Dorisio

(57) ABSTRACT

A device for containing and dispensing fluid substances includes a container having an opening and a cavity, means for connecting a first connection element, a bag with a first part, a neck and a flange, a pump, a ring nut element suitable to connect the pump and bag to the first connection element, the first connection element including upper and lower parts delimiting a tubular through seat for housing the neck and pump, the upper part including an upper opening delimited by a wall for resting a portion of the flange and connection means suitable to cooperate with counter connection means provided for in the ring nut element, the lower part of the first connection element including a lower opening and counter connection means suitable to cooperate with the connection means, the transversal dimensions of the opening being greater than or equal to the maximum transversal dimensions of the bag.

12 Claims, 15 Drawing Sheets

DEVICE FOR CONTAINING AND DISPENSING FLUID SUBSTANCES

Figure 1:
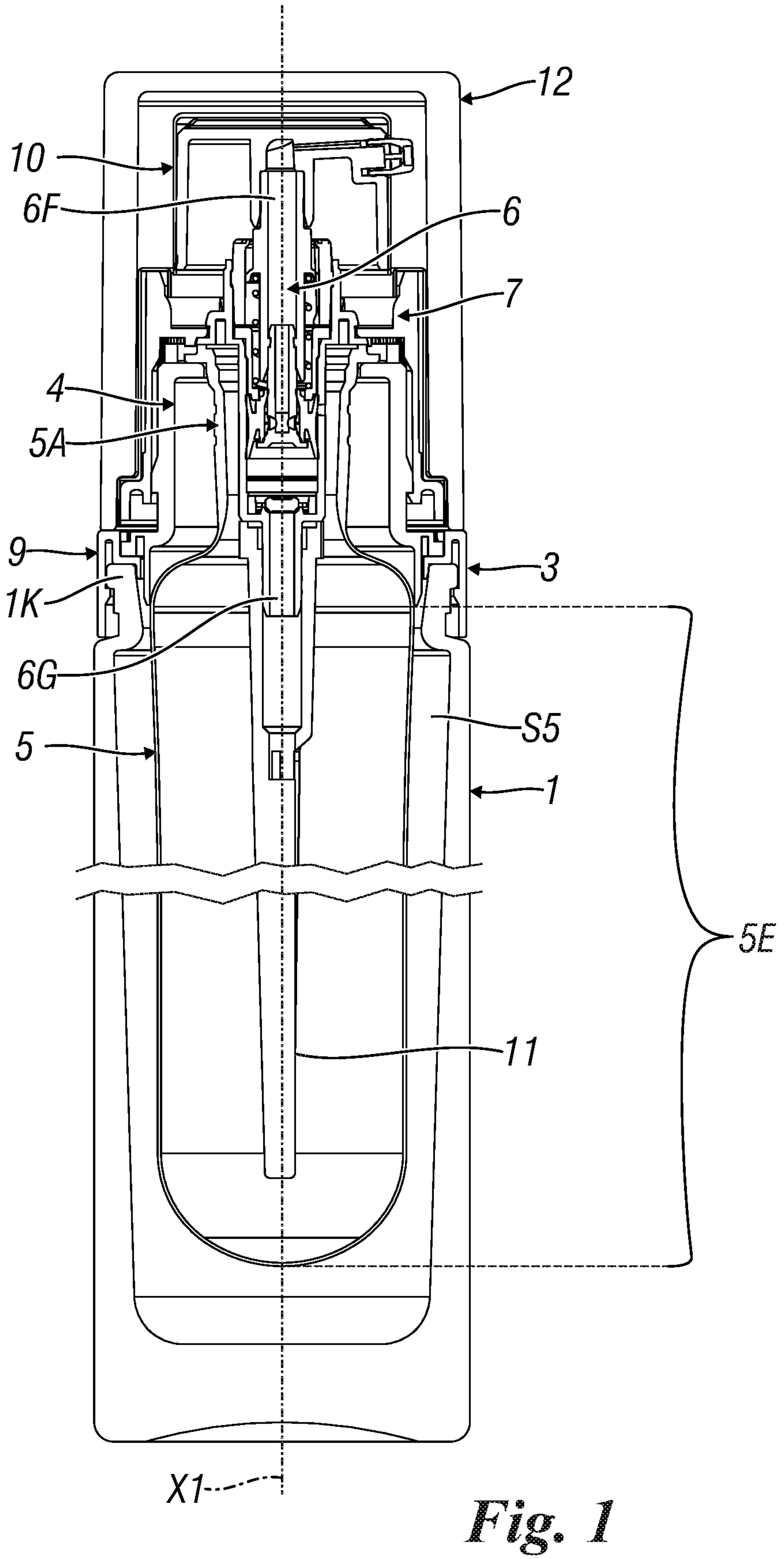

This patent application claims the benefit of Italian Patent Application for Invention No. 102021000018110 filed on Jul. 9, 2021, the disclosure of which is incorporated herein by reference.

TECHNICAL FIELD

The present invention relates to a device for containing and dispensing fluid substances.

BACKGROUND

It is known to enclose fluid substances, both liquid and creamy, in containers from which such substances are dispensed by manually actuating a pump mounted on the mouth of a respective container. The actuation of the pump causes the drawing of a predefined amount of fluid substance from the container, in which, if the container is rigid, there would be formed a vacuum which would prevent further drawing and dispensing of the substance, if there were not provided for the entry of air into the container (something which, generally, occurs at the areas of contact and sliding of the pump on the body of the pump), or should the container not comprise a bottom sealingly movable along the inner cylindrical surface of the container.

The latter system for compensating the volume of the containers for reducing the internal volume thereof and maintaining the internal pressure constant is however quite strenuous and expensive.

An alternative system provides for introducing the fluid to be dispensed in a bag made of deformable and flexible material, in turn containing a neck to which the dispensing pump is connected. The bag is introduced into an outer and hermetically sealed container by a pump after the filling.

Furthermore, the systems that use a bag are usually used for systems of the “airless” type.

A such device is shown, for example, in the Japanese patent applications JP 05 031790 and JP 05 031791. In these documents, the bag has a neck from which there transversely protrudes a flange, which—in use—rests against the vacant edge of the neck of the outer container.

Document US 2004/0112921 also discloses the association of the pump with the neck of the bag through a ring nut element which is screwed to the neck of the outer container. In this manner, the pump is kept sealingly pressed by the ring nut on the flange protruding from the neck of the bag, while there are provided for passages for the flow of air from the external to the space between the outer surface of the bag and the inner surface of the container so as to allow the bag to shrink as the amount of fluid substance dispensed by the pump increases.

In these devices, at the end of the dispensing of the fluid substance, the ring nut which retains the pump is unscrewed from the neck of the container and removed, while the bag remains inside the container. This represents a problem for the correct disposal of the device, given that should the bag be contained in a glass container, these two elements should be disposed of separately. Furthermore, it is difficult to manually remove the bag from the outer container.

A solution to this problem is illustrated in patents EP 2 243 557 and EP 3 037 174 in which the dispensing device provides for means for connecting the bag and the pump to one or more connection elements in turn connected to the neck of a rigid container suitable to contain the bag, which allow to remove these connection elements from the neck of the container and simultaneously also remove the bag from the outer container, once the substance contained in the bag has been fully dispensed. In these devices for filling the bag of the substance to be dispensed, when it is empty it should be associated with the connection elements, then inserted into the rigid container and then filled with the substance to be dispensed. The bag may be filled only when the bag has been inserted into the rigid container.

US2011/024452 teaches a device for dispensing fluid substances comprising an outer container suitable for housing a refill comprising a deformable bag, containing the fluid substances to be dispensed, in turn housed in a protection element. An upper portion of the protection element comprises: a step part suitable for resting on an upper free edge of the outer container and forming a support surface for an upper flange of the deformable bag, and portions for blocking a connecting element of the refill, which in turn, when it is blocked by said terminal portion, is able to block said flange of the bag against said step part of the upper portion of the protection element, to connect a pump to the refill, and to connect the refill to the outer container.

SUMMARY

An object of the present invention is to provide a device for containing and dispensing fluid substances which allows to fill the bag with a predefined amount of fluid substance to be dispensed alternatively to the description of the prior art, and also when the bag is not inserted into the relative container, which however also allows to remove the bag from the container once said substance contained in the bag has been dispensed. Another object of the invention is to provide a device for containing and dispensing fluid substances that is easy to manufacture as well as reliable and safe to use.

A further object is to provide a device that is more sustainable from an environmental and ecological point of view and which allows a partial re-use of at least some of the components thereof.

These and other objects are achieved by providing a device for containing and dispensing fluid substances obtained according to the technical teachings of the attached claims.

BRIEF DESCRIPTION OF THE DRAWING FIGURES

Figure 2A:
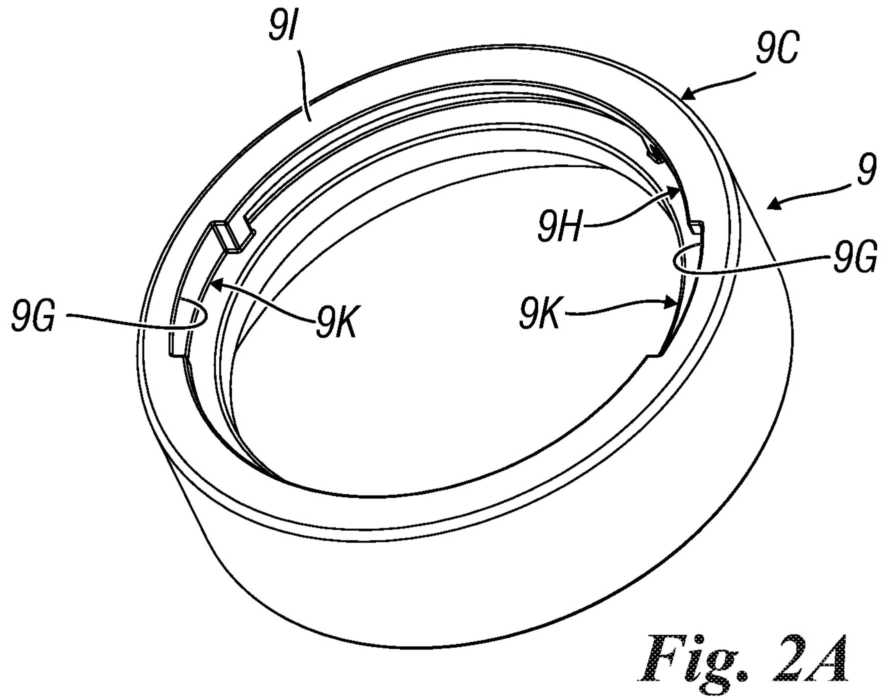
Figure 2B:
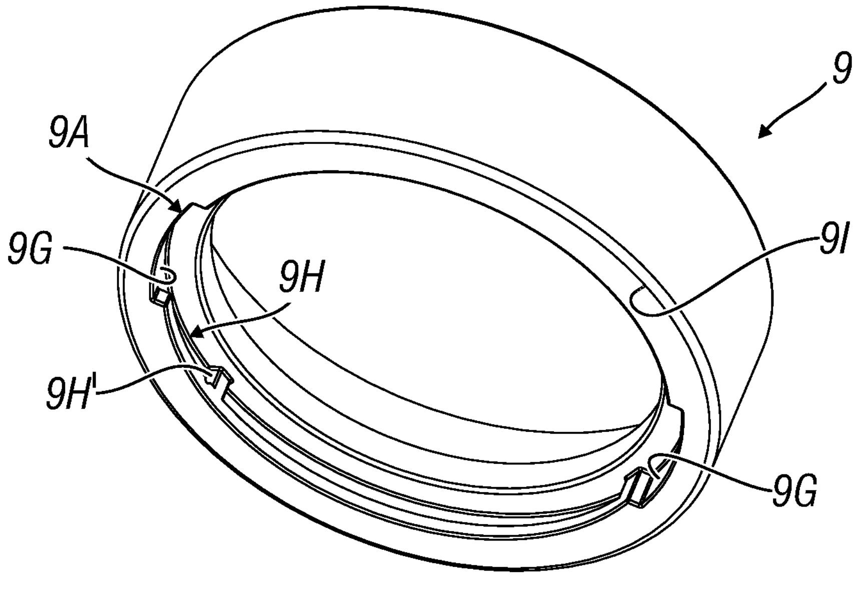
Figure 3A:
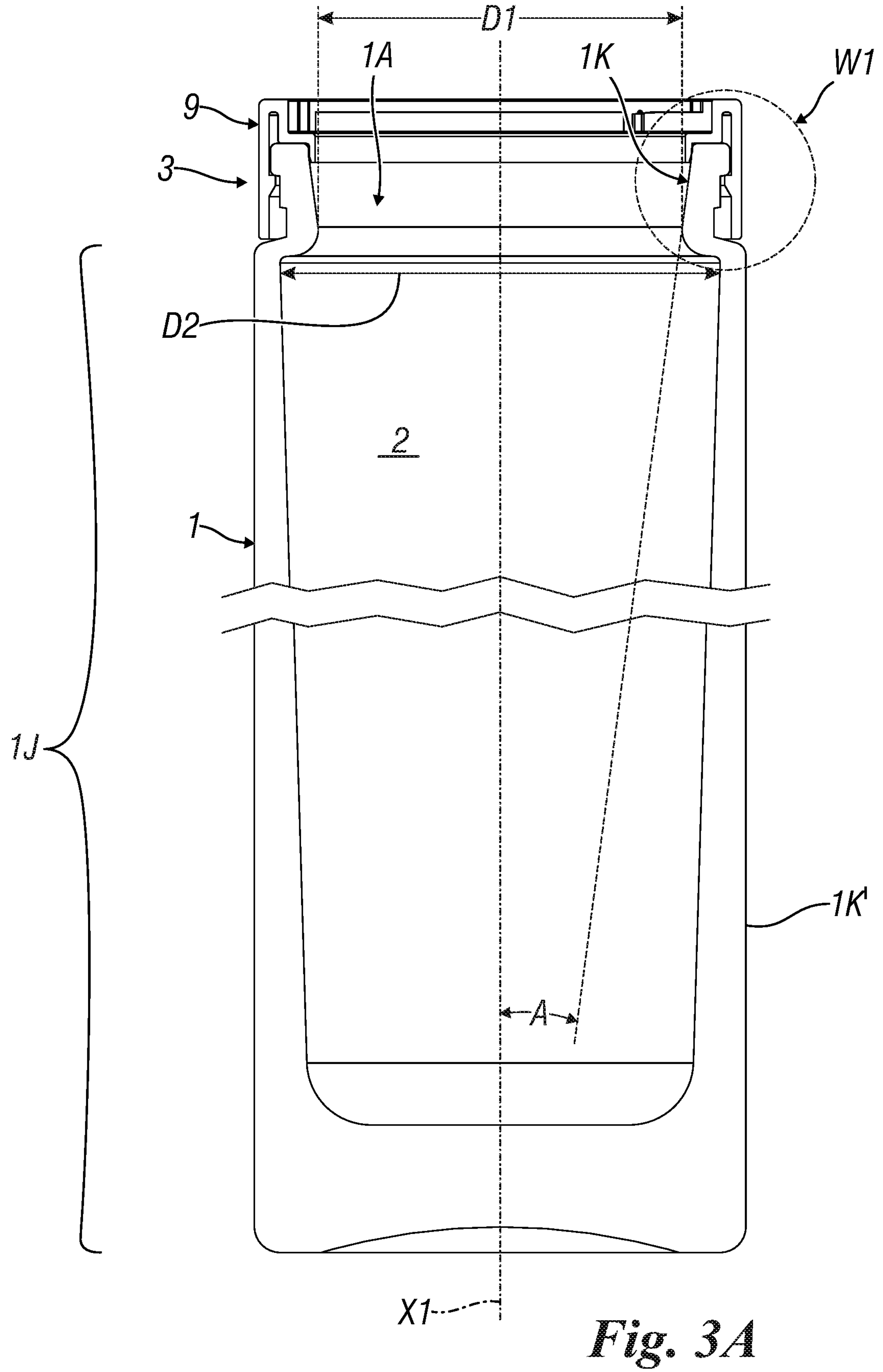
Figure 3B:
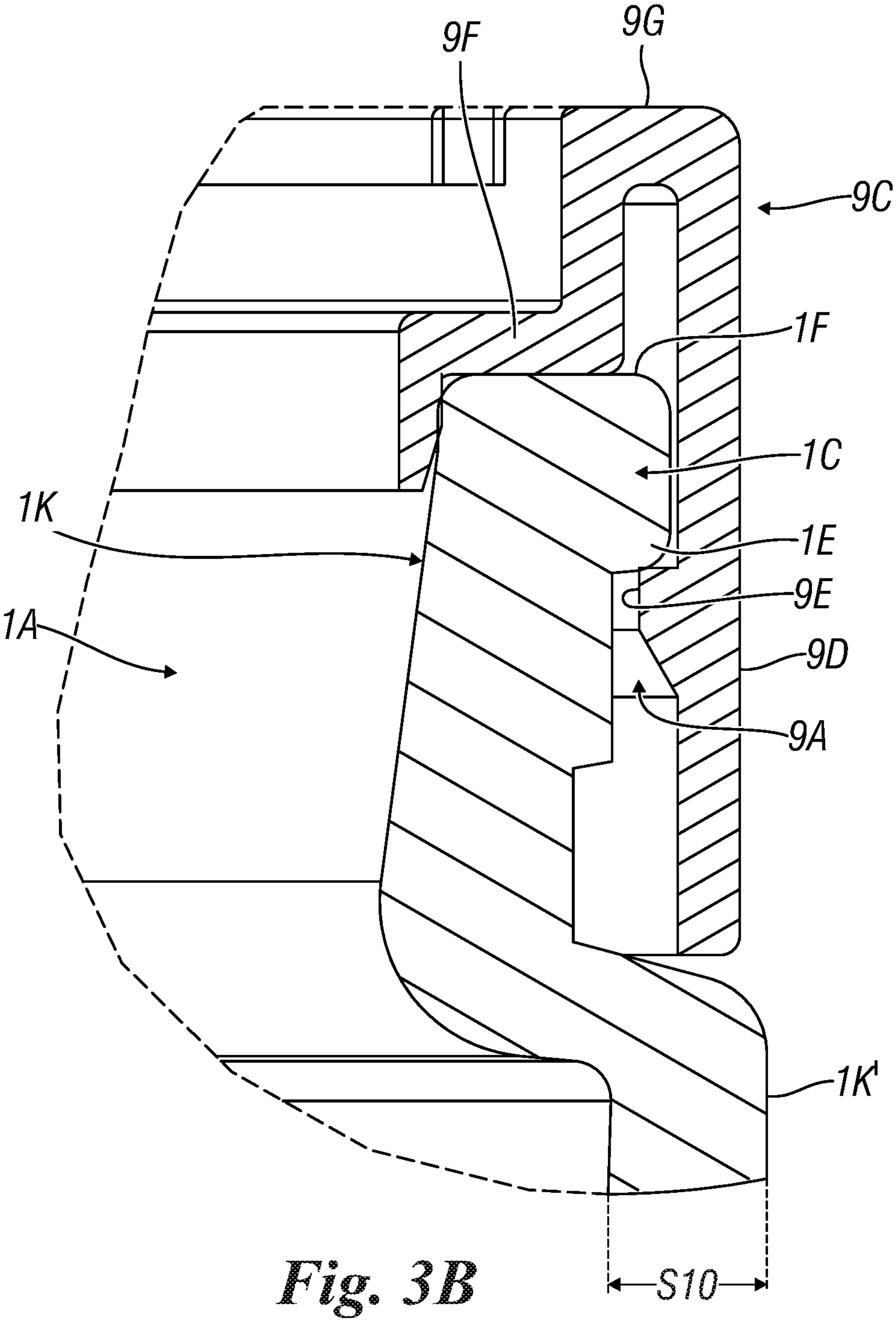
Figure 4A:
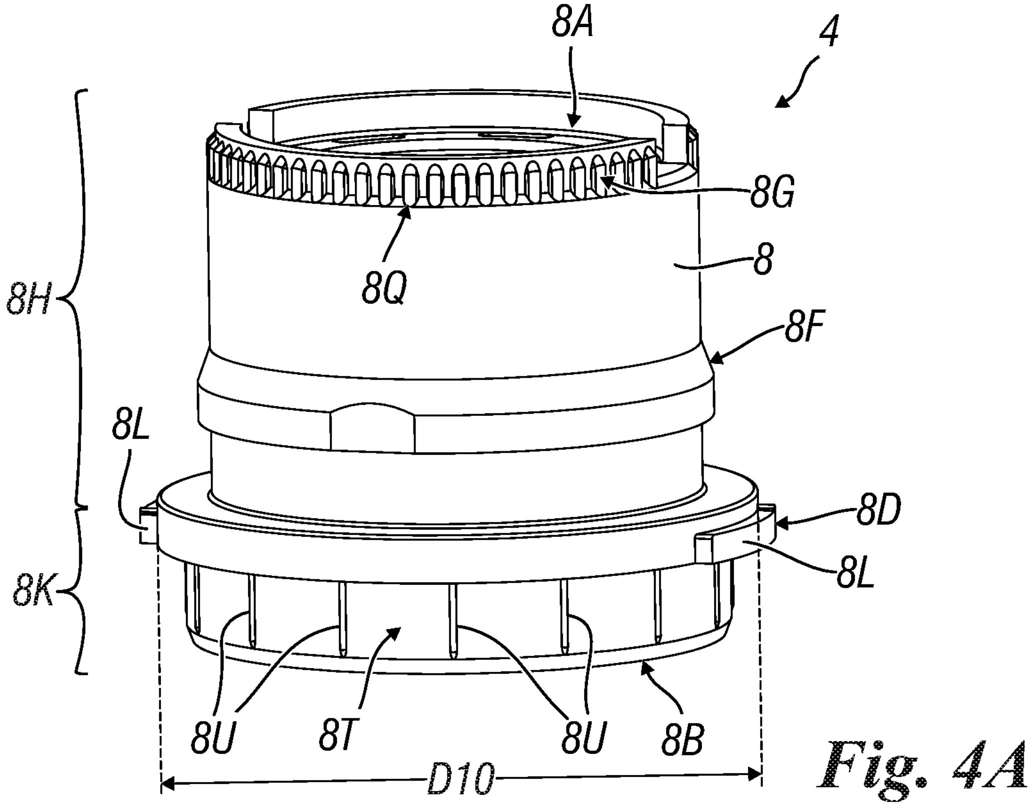
Figure 4B:
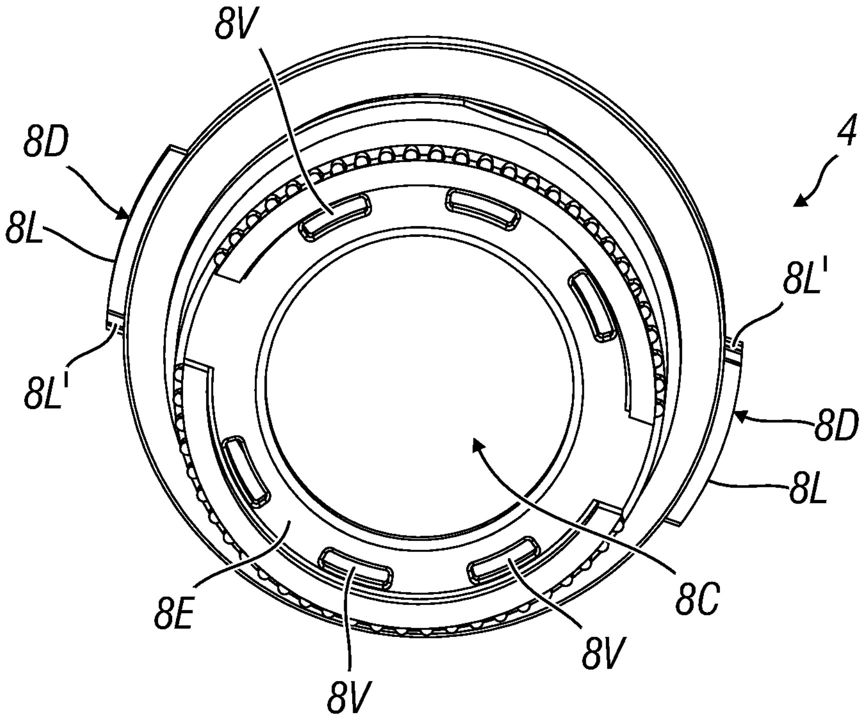
Figure 4C:
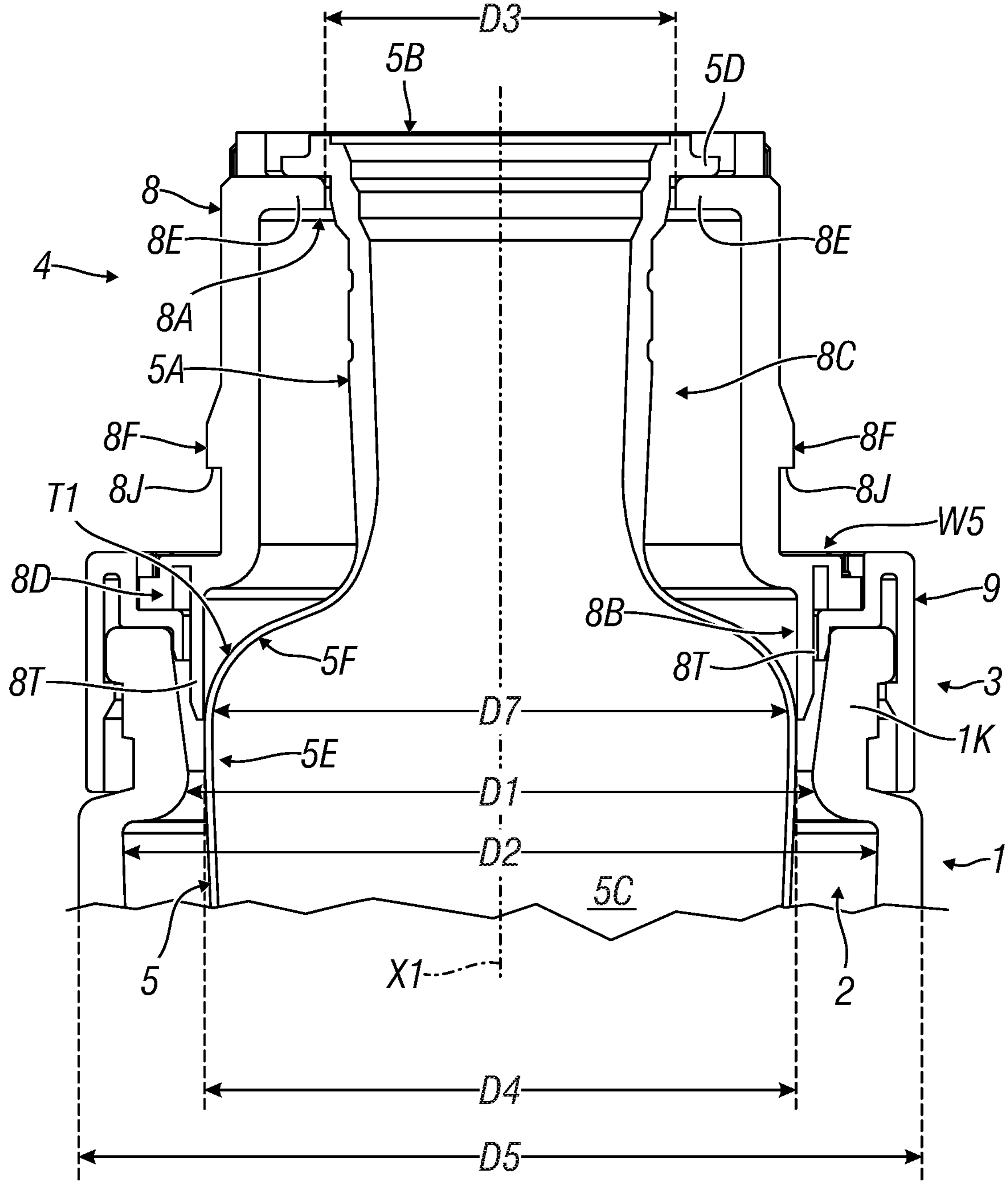
Figure 4D:
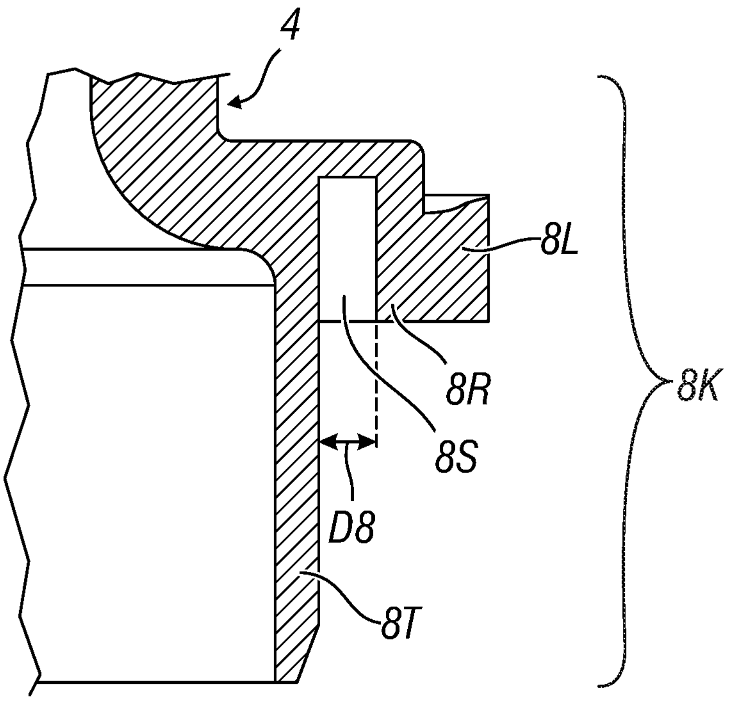
Figure 4E:
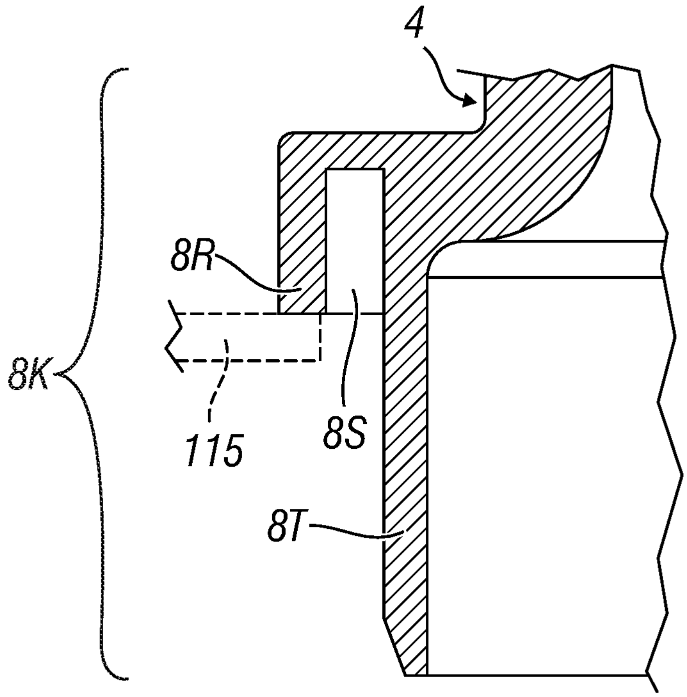
Figure 5:
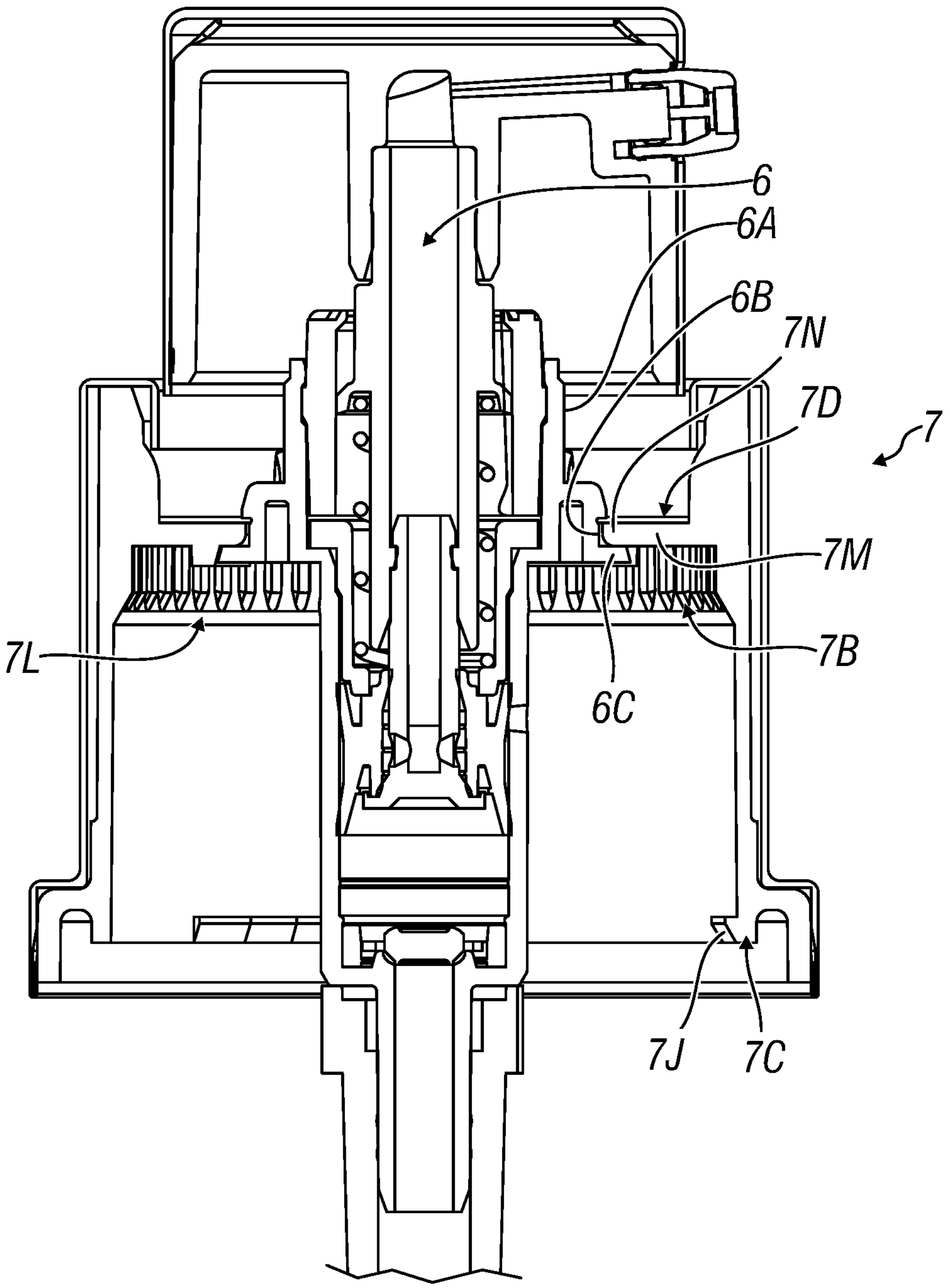
Figure 6A:
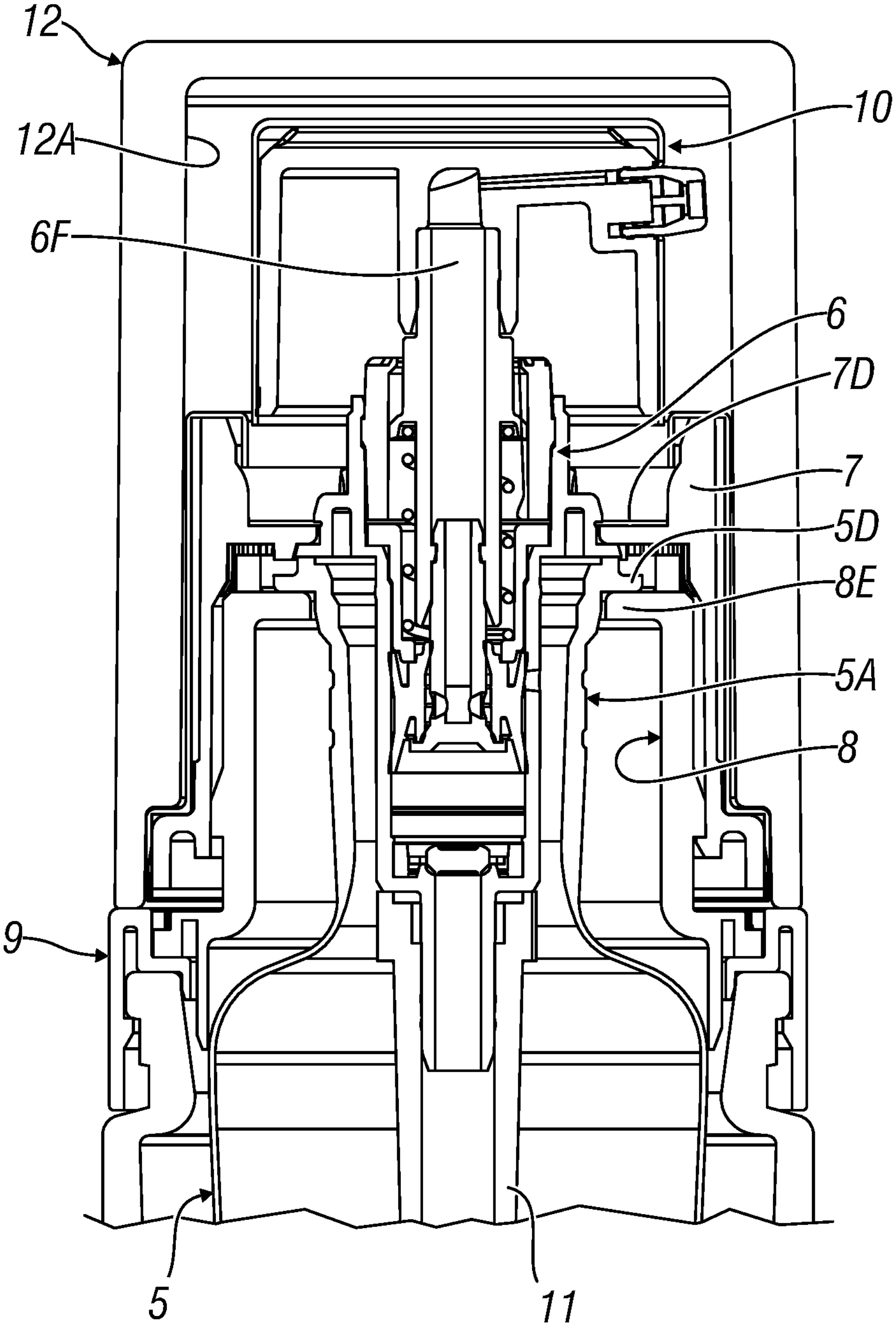
Figure 6B:
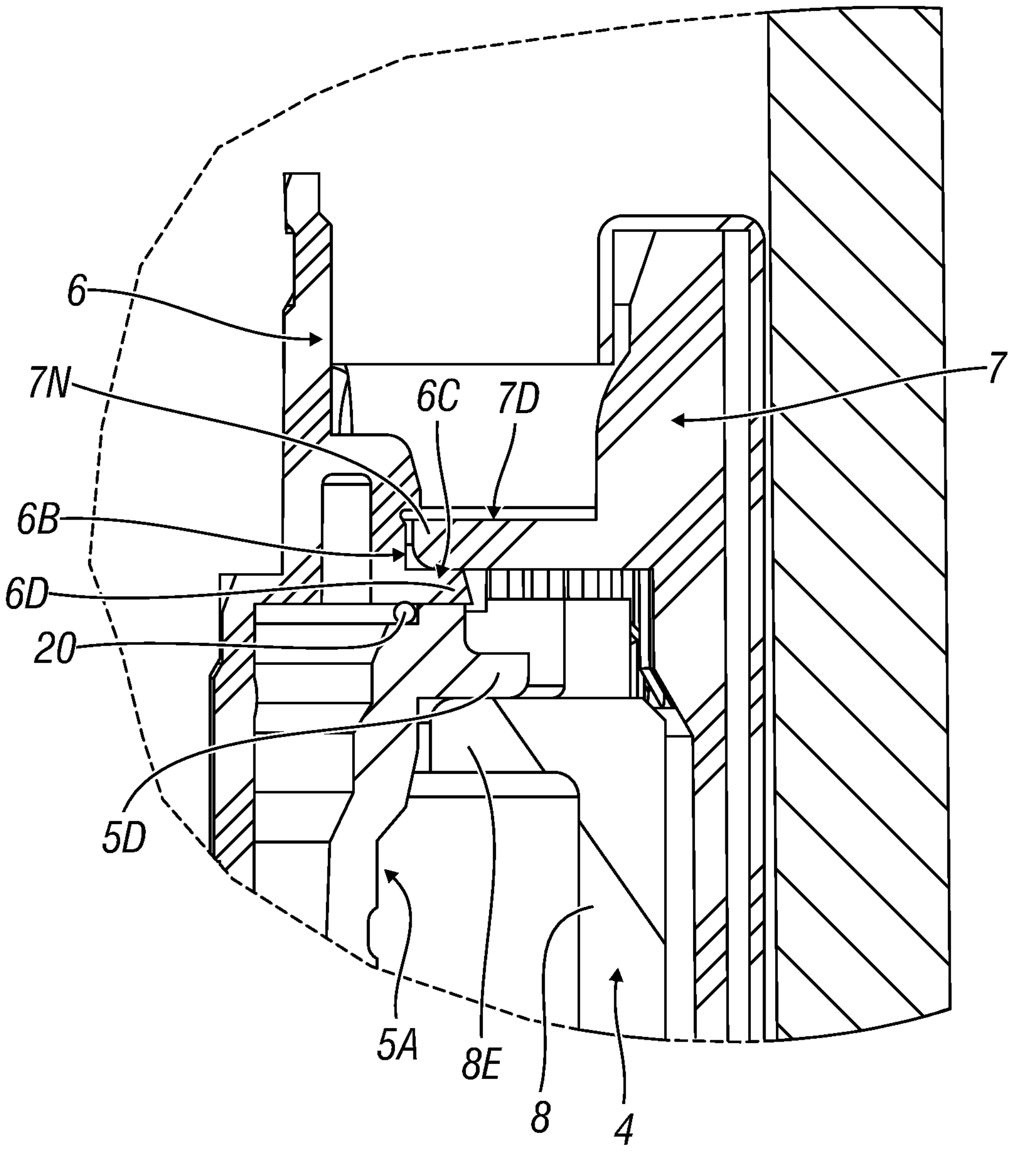
Figure 7:
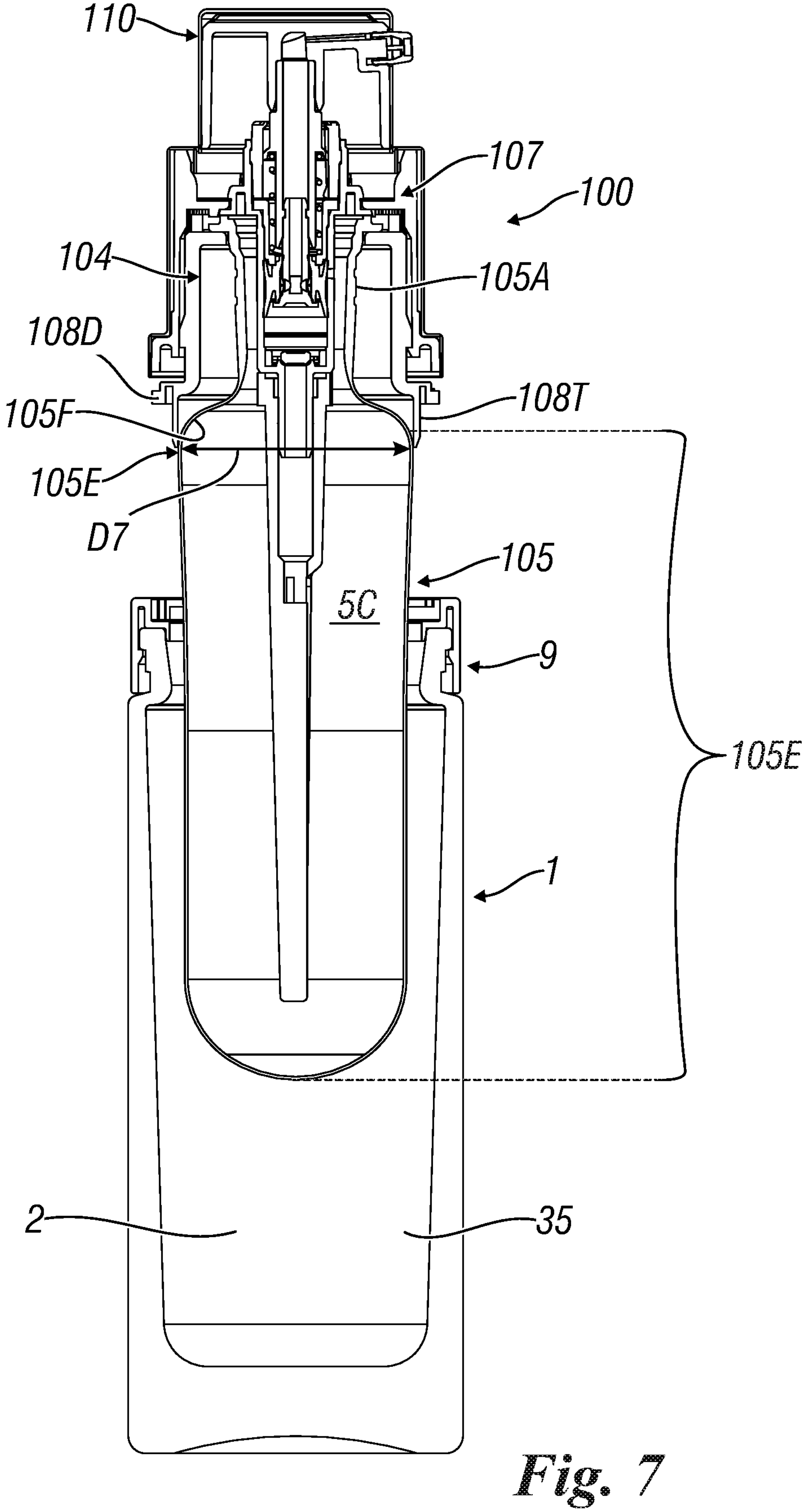
Figure 8:
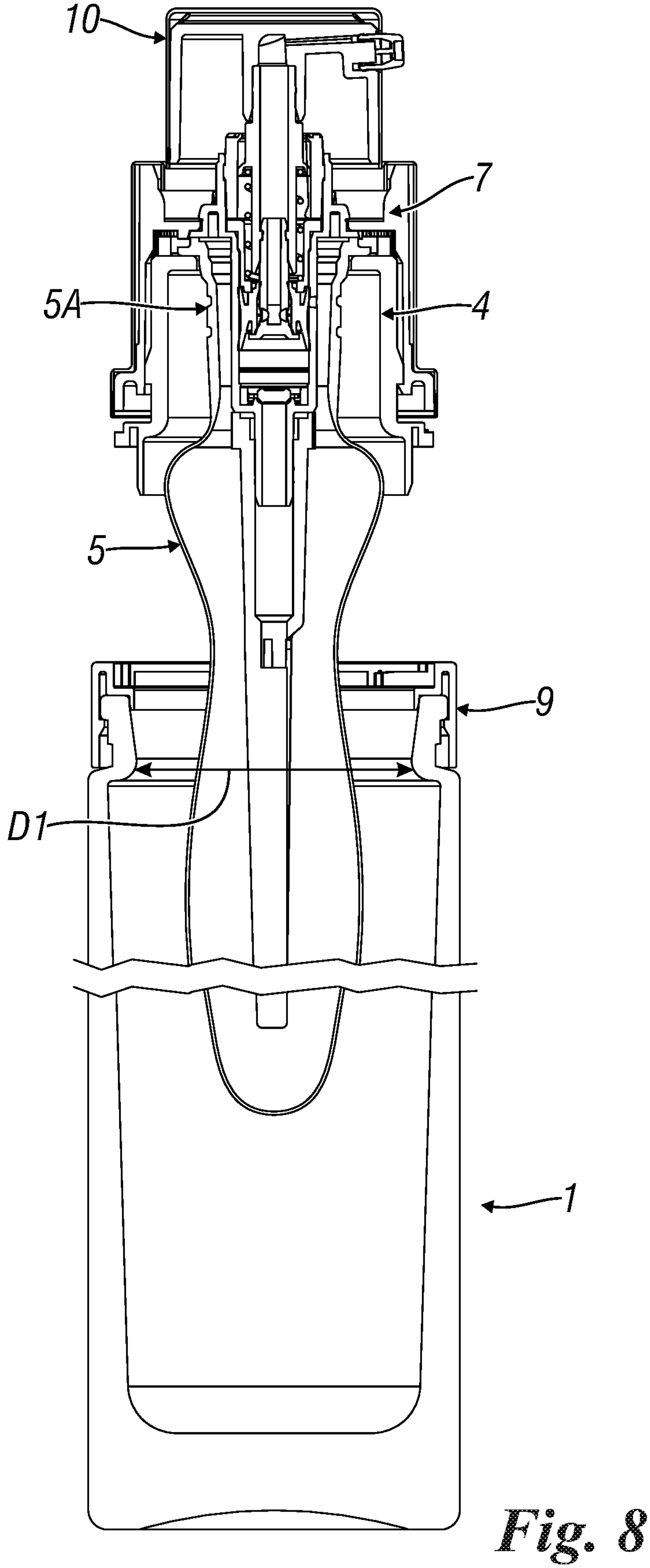
Figure 9A:
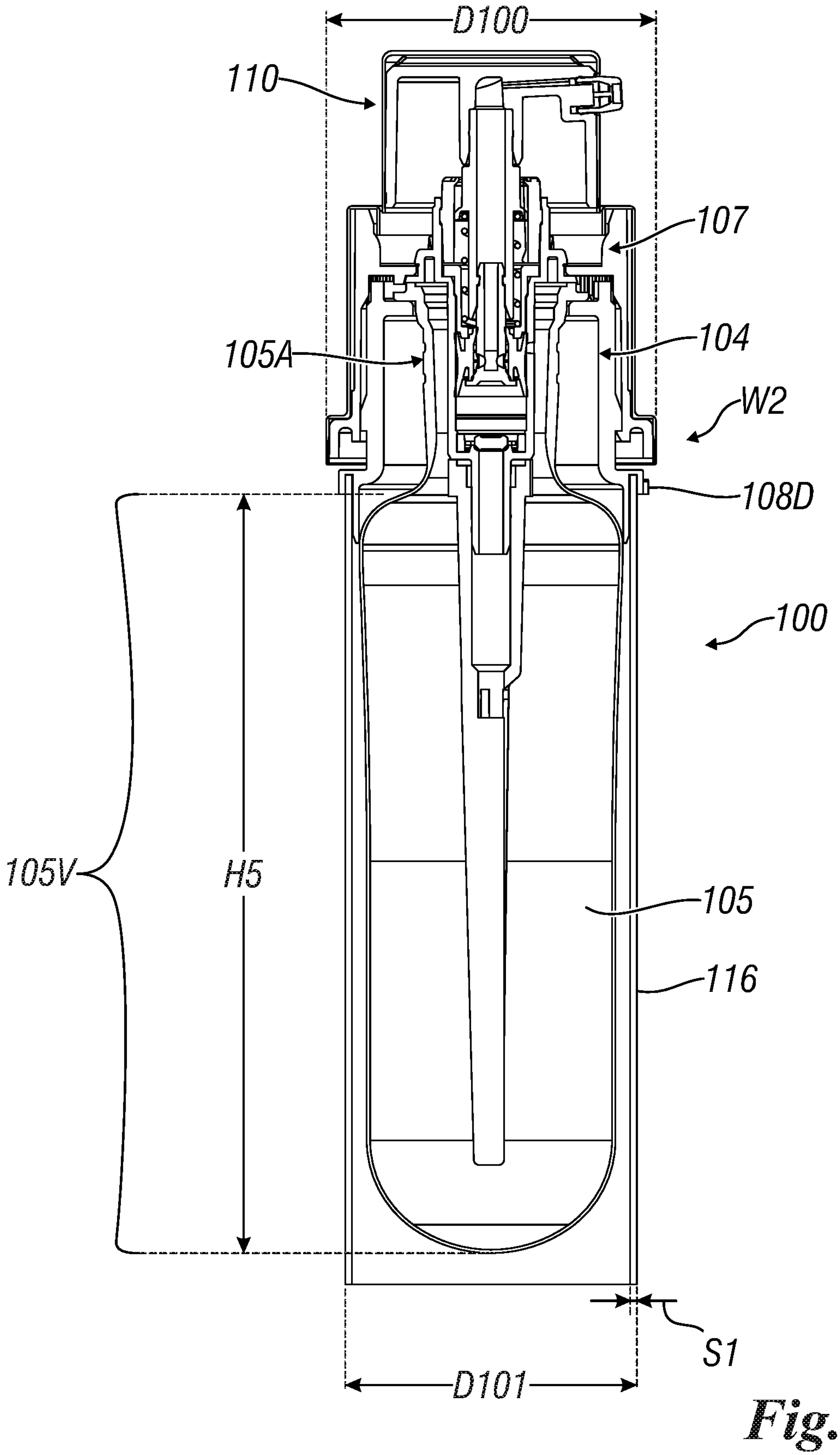
Figure 9B:
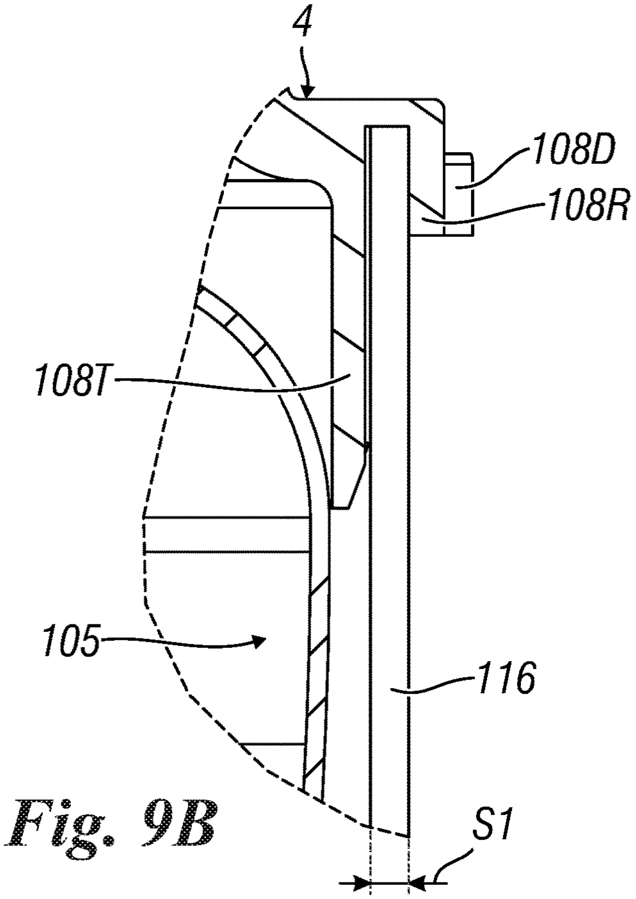
Figure 9C:
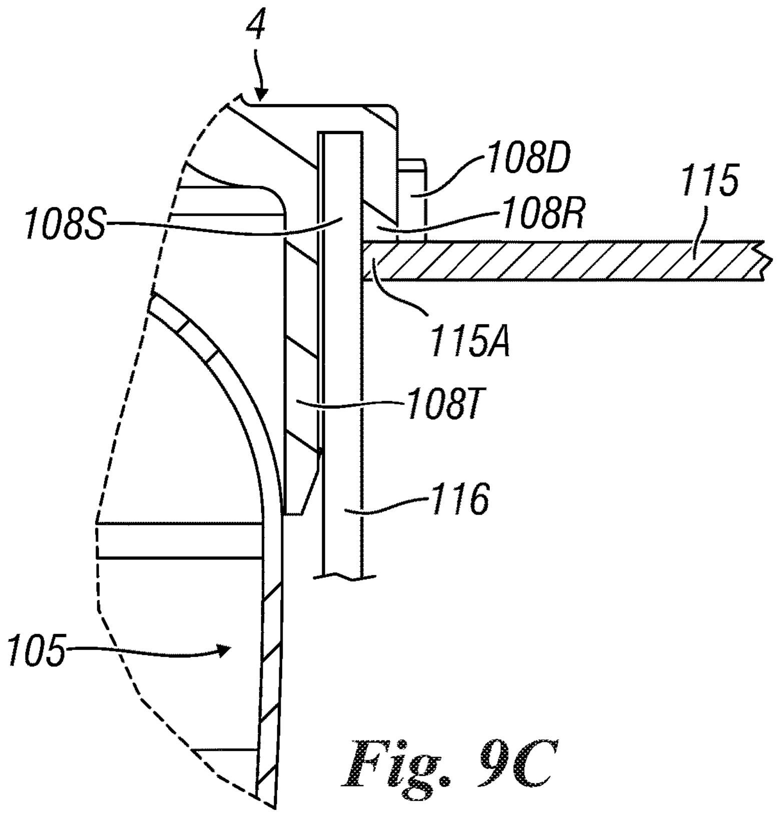
Figure 10A:
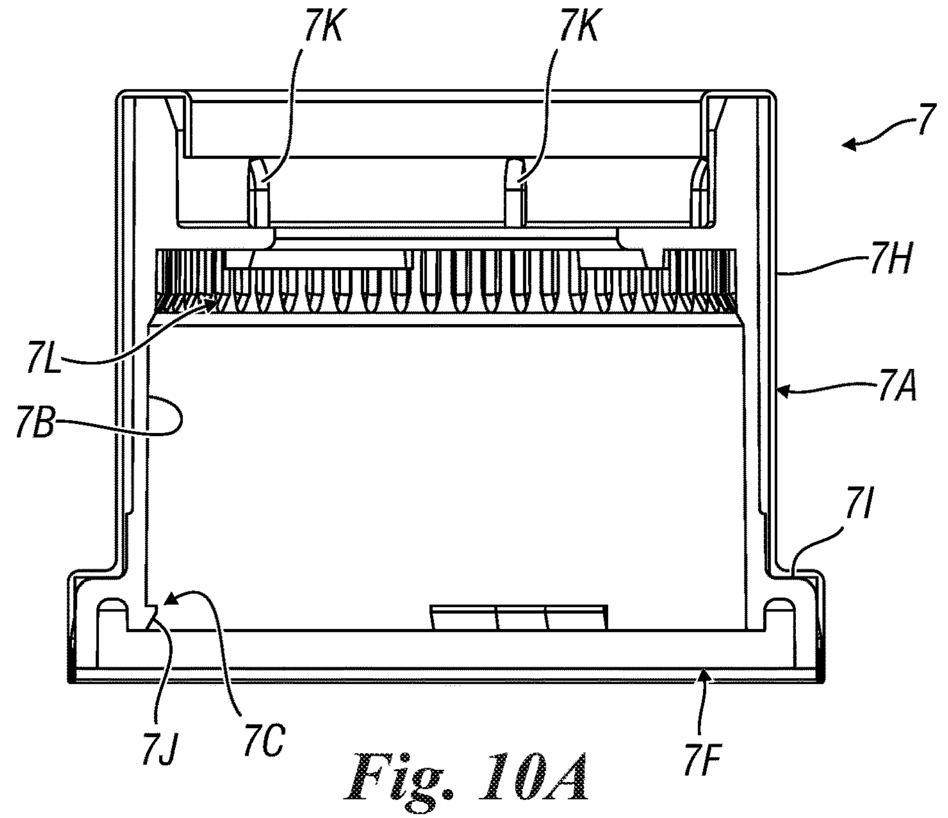
Figure 10B:
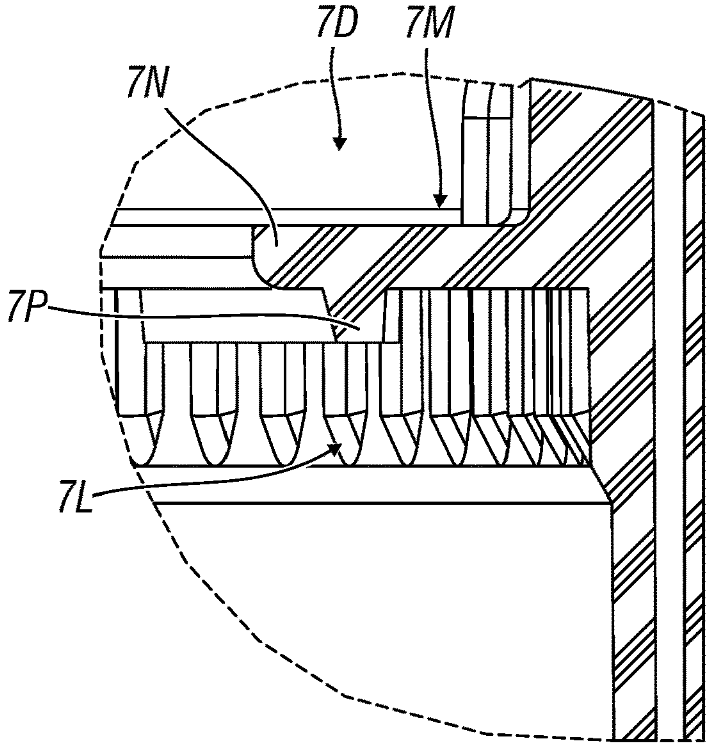

Further characteristics and advantages of the invention will be apparent from the description of a preferred but not exclusively embodiment of the device for containing and dispensing fluid substances, illustrated by way or non-limiting example in the attached drawings, wherein:

FIG. 1 shows a sectional schematic view of a device according to the invention, FIGS. 2A, 2B show schematic perspective views taken from two different angles of a first component of the device, FIGS. 3A and 3B respectively show a sectional schematic view of and an enlarged schematic view of the detail indicated by the arrow W1 of FIG. 3A of the first component shown in FIGS. 2A, 2B when it is associated with a container, FIGS. 4A, 4B show schematic perspective views taken from two different angles of a second component of the device, FIG. 4C shows a sectional schematic view of the first and of the second component when they are associated with each other and with a container (the latter shown only partially);

FIGS. 4D and 4E show sectional schematic views, taken in two different positions, of a lower part of the second component of FIG. 4A, FIG. 5 shows a sectional schematic view of a third component of device associated with a common pump for dispensing fluid substances, FIGS. 6A, 6B show two sectional schematic views, in different scales, of the first, of the second and of the third component when they are associated with each other and with a pump, with a dispensing cap, and with a cap and this assembly is associated with a container (the latter shown only partially);

FIG. 7 shows a sectional schematic view of a possible step for assembling the device, and also of a refilling device, FIG. 8 shows a sectional schematic view of a first step for disassembling the device FIGS. 9A, 9B, 9C show sectional schematic views of the partially assembled device and an enlarged view of the detail indicated by the arrow W2 of FIG. 9A, and a second view of the detail of FIG. 2 when a protection element is also associated therewith, FIGS. 10A, 10B show sectional schematic views of a further component of the device of FIG. 1.

DETAILED DESCRIPTION

With reference to the FIGS. 1-6, they show a device according to the invention for containing and dispensing fluid substances, comprising a container 1 having an opening 1A (FIG. 3A) for access to a cavity 2 of the container, and having means 3 (described in detail hereinafter) for connecting a first connection element 4 to said container removably and at said opening 1A.

The device also comprises a bag 5 made of a deformable material, suitable to contain a predefined amount of said fluid substances to be dispensed, and comprising: at least one first part 5E (FIG. 1) suitable to be housed in said cavity 2 of the container and in turn delimiting a cavity 5C suitable to contain said fluid substances to be dispensed, a neck 5A (FIG. 4C) which departs from an end of said first part 5E of the container, and which has an opening 5B (FIG. 4C) for access to said cavity 5C of said first part 5E of the bag, a connection part 5F between said neck and said first part 5E, and a flange 5D (FIG. 4C) which extends transversely to said neck of the bag at said opening 5B of the neck;

In the context of the present invention, the expression a flange which extends transversely is used to indicate a flange which extends in a direction not parallel to a longitudinal axis X1 (FIG. 1).

The device also comprises a pump 6 (FIG. 5) which can be actuated manually to draw the fluid substance from the bag 5 and supply it to the external, for example through a dispensing stem 6A of the pump connected to a member 10 for actuating the pump and dispensing the substance. The pump 6 is at least partially housed in the neck 5A of the bag 5.

The device also comprises a ring nut element 7 connected, for example snap-coupled, to said first connection element 4, and suitable to connect said pump 6 and said bag 5 to said first connection element 4.

According to the invention the first connection element 4 comprises a tubular body 8 having an upper part 8H (FIG. 4A) and a lower part 8K which delimit a tubular through seat 8C (FIG. 4C) suitable to at least partially, and preferably fully, house the neck 5A of the bag 5 and at least partially the pump 6, when it is inserted into the neck. The upper part 8H comprises an upper opening 8A delimited by a wall 8E for resting at least one portion of said flange 5D of the neck 5A of the bag 5 (as shown in FIG. 4C) and connection means 8F, 8G (FIG. 4A) suitable to cooperate with counter connection means 7B, 7C (FIG. 5) provided for in the ring nut element 7 for stably constraining said first connection element 4 and said ring nut element 7 to each other so that said ring nut element 7—when it is connected to the first connection element 4 and to the pump 6—constrains also said first connection element 4 and said at least one portion of said flange 5D to each other. In this manner, even when said first connection element 4 is released from the container 1, the bag remains stably associated with the system consisting of the first connection element 4, the ring nut 7 and the pump 6 (as shown in FIG. 8).

Still according to the invention, the lower part 8K of the first connection element 4, comprises a lower opening 8B and counter connection means 8D, suitable to cooperate with the connection means 3 provided for at the access opening 1A of the container 1 (as described in greater detail hereinafter) to removably connect said tubular body of the first connection element 4 to said container.

Preferably, the openings 8A and 8B of the two upper and lower parts 8H and 8K have maximum transversal dimensions D3 and D4 different from each other with the upper opening 8A having smaller transversal dimensions D3 with respect to those D4 of the lower opening 8B.

According to the invention, the maximum transversal dimensions D1 (FIG. 3A) of the opening 1A of the container are greater than or equal to the maximum transversal dimensions D7 (FIGS. 4C and 9) of the bag 5 so as to allow to insert at least the first part 5E of the bag 5 containing the predefined amount of said fluid substances to be dispensed (FIG. 7) into said container 1, and then to allow to connect the first connection element 4 to the container 1, or—vice versa—to allow to remove said first part 5E of the bag (FIG. 8) from the container 1 once it has been emptied of the substance to be dispensed and once the first connection element 4 has been disconnected from the container 1, wherein—both when inserting said first part 5E of the bag into the container 1 and when removing said first part 5E of the bag 5 from the container 1—they remain stably constrained to said first connection element 4, at least said bag 5, said ring nut element 7 and said pump 6.

Preferably, the means 3 for connecting the first connection element 4 to said container removably and at said opening 1A comprise: a second connection element 9, having first connection members 9A (FIG. 3B) suitable to cooperate with counter connection members 10 (FIG. 3B) provided for at the access opening 1A of the container 1, suitable to mutually stably connect this second connection element to the upper edge of the container 1, and second connection members 9K (FIG. 2A) suitable to cooperate with counter connection members 8L (FIG. 4A) of the body 8 of the first connection element 4, to removably connect the latter to the second connection element 9 and lastly to the container 1.

In greater detail, the second connection element 9 preferably provides for an annular body 9C (FIG. 3B) having an outermost wall 9D which comprises the first connection members 9A which comprise—for example at the inner face of the outer wall 9D—a step 9E suitable to snap-cooperate with a corresponding step 1E provided for in the outer face of the upper edge of the container 1 (FIG. 3B).

The steps 9E and 1E are conformed so that by pushing the second is connection element 9 coaxially and downwards along the neck of the container 1, the two steps are coupled to each other stably constraining these two components and preventing mutual axial movements.

Inside, the body 9C has a wall 9F suitable to abut against the upper face 1F of the edge of the container when the steps 9E and 1E are coupled to each other (FIG. 3B).

The second connection members 9K are for example provided for at the upper face 91 of the body 9C and they are for example suitable to cooperate with counter connection members 8L (FIG. 4A) of the first connection element 4 to obtain, for example, a removable connection of the bayonet-like type. To this end, for example, the counter connection members 8L have two circle arc protrusions, suitable to penetrate into corresponding openings 9G (FIG. 2A, B) provided for in the upper face 91 of the body 9C of the second connection element, and to rotate in tracks 9H provided for below said upper face 91 for removably mutually connecting the first and second connection element. Advantageously, the counter connection members 8L have an end portion 8L' (FIG. 4B) suitable to penetrate (for example with a slight interference) into an end-of-stroke seat 9H' (FIG. 2B), so that there is an at least partial locking of the coupling of these two parts, and on the other hand, when the first connection element 4 is manually associated with the second connection element 9 (like in the case, for example, where a refilling device is associated with a container, as described hereinafter) there is perceived an end-of-stroke.

Preferably, the container 1 has a neck 1K (FIG. 3B) whose outer face has a step 1E for the stable connection with the second connection element 9.

It is clear that the cylindrical conformation of the container 1 is an exemplifying embodiment but that the container 1 may have any shape common to the person skilled in the art, for example with square-shaped cross-section, elliptical cross-section, conical-shaped etcetera.

The container 1 may be made of a rigid material, for example made of glass, or however made of a material similar to the type used for containing cosmetic products such as for example: aluminium, plastic, wood, cardboard, ceramics.

As discussed hereinafter, the assembly formed by the container 1 and by the second connection element 9 may be reused once the substance contained in the bag 5 has been fully dispensed, and this allows an advantage in terms of environmental sustainability of the device.

The volume of the container 1 is greater than that of the full bag.

The bag 5 is preferably made of thermoplastic material, for example: PP, PE, LDPE, HDPE, but there may be provided for a bag made of another deformable material suitable to contain a fluid substance, such as for example aluminium plastic-coated paper or a material consisting of multilayer material for example PP+PA, PP+EVOH, PE+PA, PE+EVOH, of the conventional type for the person skilled in the art in any case.

As already indicated further above, the first connection element 4 comprises a tubular body 8 having an upper part 8H (FIG. 4A) and a lower part 8K which delimit a tubular through seat 8C (FIG. 4C) suitable to at least partially, and preferably fully, house the neck 5A of the bag 5 and at least partially the pump 6. When associated with the second connection element 9, the tubular body is preferably coaxial to the longitudinal axis X1 of the container of the bag of the second connection element.

The connection means 8F (FIG. 4A) suitable to cooperate with counter connection means 7C, (FIG. 5) provided for in the ring nut element 7, axially stably constrain the first connection element 4 and the ring nut element 7 to each other, and comprise, for example at the outer face of the tubular wall of the upper part 8H of the body 8, a step 8J (FIG. 4C) suitable to snap-cooperate with a corresponding step 7J (FIGS. 5 and 11A) of the ring nut element 7, provided for in the inner face 7B (FIG. 10A) of the tubular body 7A of the ring nut and at a lower opening 7F of such body 7A (FIG. 3B). The steps 8J and 7J are conformed so that—by pushing the ring nut coaxially and downwards along the first connection element 4—the steps are coupled to each other stably constraining these two components and preventing mutual axial movements (as shown in FIG. 6A).

The connection means 8G (FIG. 4A) suitable to cooperate with counter connection means 7B (FIG. 5) provided for in the ring nut element 7, rotatably connect the first connection element 4 and the ring nut element 7 to each other, preventing mutual rotations, and comprise, for example, at the outer face of the tubular wall of the upper part 8H of the body 8, a gear tooth 8 (FIG. 4A) suitable to cooperate with a corresponding counter gear tooth 7L (FIGS. 5 and 11A) of the ring nut element 7, provided for in the inner face 7B (FIG. 11A) of the tubular body 7A of the ring nut. The gear teeth 8Q and 7L are conformed so that—by pushing the ring nut coaxially and downwards along the first connection element 4 the two gear teeth mesh with each other stably constraining these two components and preventing the mutual rotations.

The lower part 8K (FIG. 4A) of the tubular body 8 of the first connection element 4 forms an annular appendage which forms a sort of protruding step with respect to the upper part 8H of the body 8. As mentioned above, the two circle arc protrusions 8L for removably connecting the first connection element 4 with the second connection element 9 depart from this appendage, angularly spaced apart from each other. The lower part 8K— at the lower end thereof— has an outermost annular flat surface 8R, an intermediate annular fissure and an inner tubular wall 8T.

The annular flat surface 8R is suitable to abut against the flange 9E (FIG. 3B) of the second connection element 9 when the latter is connected to the container 1. Furthermore, as described hereinafter, this surface is also suitable to facilitate the automated filling of the bags, given that it can abut against a rest surface of a station for filling the bags when the latter are associated with the first connection element 8 alone (a portion of this rest surface is schematically shown in FIG. 4E).

The intermediate annular fissure 8S, forms a seat for inserting an upper edge of a protection element 116 (FIG. 9A) having a thickness S1 substantially equal to the transversal dimensions D8 (FIG. 4D) of the fissure 8S of the first connection element 4 so as to forcedly insert this upper edge of the second container 116 thereinto.

The inner tubular wall 8T is suitable to stabilise the position of the bag 5 both when the latter is associated with the first connection element 4 and guarantee the coaxiality thereof with the element 4, and when the bag 5 simply rests on the element 4 and it is not yet stably constrained to this element 4 by the ring nut 7. To this end, preferably the tubular wall 8T is dimensioned so that the end portion thereof is in contact with and surrounds at least one upper section T1 (FIG. 4C) of the first part 5E of the bag provided for immediately below the part 5F of the bag for connecting with the neck 5A.

The tubular wall 8T also defines the maximum transversal overall dimensions that the bag 5 may have when it is fully filled with the substance to be dispensed. As shown in FIG.

4C, the inner diameter D12 of the tubular wall 8T must be greater than or equal to the maximum transversal outer diameter D7 of the bag 5 when it is fully filled with the substance to be dispensed, and this inner diameter D12 is smaller than or equal to the minimum diameter D1 of the opening of the container 1.

Along the outer face thereof, the inner tubular wall 8T has a plurality of vertical reliefs 8U (FIG. 4A) which are suitable to allow the external air to flow into the space S5 (FIG. 1) which is created between the outer face of the bag 5 and the inner face of the container 1. This air circulation is necessary should there be used an airless pump, given that it allows the bag 5 to collapse as the substance contained therein is dispensed. The reliefs 8U also allow the outflow of air of the air from the container when a bag 5 is inserted into the container (as described hereinafter).

The connection element also has through holes 8V (FIG. 4B) in the flange 8E, also designed to increase the circulation of air from inside the container towards the external when inserting a bag and also allow the collapsing of the bag should the pump be of the airless type.

A further air exchange occurs also because there is no hermetic connection between the ring nut 7 and the first connection element 4, considering that the steps 7J of the ring nut 7 do not extend over the entire circumference of the outer wall of the ring nut, but only for circle arcs of this circumference.

As already indicated further above, the ring nut element 7 has means 7D suitable to stably connect the pump 6 to the ring nut, the latter means for example comprise an annular flange 7M (FIG. 10B) which departs from the inner surface of the tubular wall 7E of the ring nut element 7, the innermost vacant edge 7N of this annular flange 7M is suitable to be snap-inserted into an annular fissure 6B provided for on the outer face of the body 6A of the pump 6 (FIG. 5), stably connecting the pump to the ring nut. The annular fissure 6B of the body of the pump 6 is delimited at the lower part by an annular flange 6C (FIG. 6B) having a lower annular flat surface 6D (FIG. 5) suitable to abut against and stably lock the flange 5D of the neck 5A of the bag 5 to the first connection element 4, when the pump is stably connected to the ring nut element 7 and the latter is stably connected to the first connection element 4, so that the assembly comprising the pump 6, the ring nut element 7, the bag and the first connection element 4 is an assembly of components stably connected to each other. This assembly can then be removably connected to the container by connecting the first connection element 4 with the second connection element 3, as shown above (and as shown in FIG. 6).

The ring nut 7 at the annular flange 7M also provides for vertical abutments 7K (FIG. 10A) suitable to support and further improve the connection of the pump to the ring nut.

The pump 6 is of the conventional type for the person skilled in the art and therefore will not be described in detail hereinafter.

Preferably, the pump is of the airless type and it is for example suitable to create a maximum vacuum (with respect to the ambient pressure) comprised between about 400 and 800 millibars, and more preferably equal to about 600 millibars in the bag 5. The bag 5 in this range of maximum pressure values is fully deformed or collapsed and the fluid substance contained therein has been dispensed. Therefore, in the present context, the expression deformable bag is used to indicate a bag whose walls have collapsed fully at the pressure values created by the pump.

In the case of an airless pump, it is preferable to provide for a sealing member 20 (FIG. 6B) between the annular flange 6C of the pump and the flange 5D of the neck 5A of the bag 5, which ensures an airtight connection between the pump and the bag.

The device also comprises, connected to an upper stem 6F (FIG. 6A) of the pump 6, a common member 10 for dispensing and actuating the pump, and connected to a lower stem 6G a floater 11 (FIG. 1). Both the member 10 and the floater 11 are of the conventional type for the person skilled in the art and they will not be described in detail hereinafter.

The device also comprises a conventional cap 12 suitable to cover the parts of the device provided for above the second connection element 9 which remain exposed. Preferably, the inner tubular surface 12A (FIG. 6A) of the cap is in contact with the outer surface 7H (FIG. 11A) of the ring nut 7 and it abuts—at the lower part—against a lower shoulder 71 of the ring nut and against a flat upper surface 9G (FIG. 2A) of the second connection element 9 (as shown in FIG. 6A).

The fluid substance to be dispensed may be of any type but preferably a cream, gel, foundation, serum etc.

In the context of the invention, the expression stable constraint is used to indicate a constraint such that once constrained to each other, the elements are not dissociated from each other, when they are subjected to the common forces with which the device is handled in the various steps of use and/or loading and/removal thereof (shown in detail hereinafter). For example, the ring nut 7 and the first connection element 4 are not released from each other when said first connection element 4 is dissociated and moved away from the second connection element 9 and therefore from the container, and also the bag 5 is not released from the ring nut 7 and from the first connection element 4. So that by moving away said ring nut element 7 from the container 1, the bag 5 is also automatically removed from the container. Obviously, although the bag can be dissociated from the ring nut element and from the first connection element, such operation requires applying a significantly great suitable force, much greater than the one usually acting on the bag during the operations mentioned above, to the bag. Similar observations shall also apply to the stable connection of the pump 6 to the ring nut 7, for stably connecting the ring nut 7 to the first connection element 4, and for stably connecting the second connection element 9 to the neck 1K of the container 1.

Preferably, all components of the device are coaxial to a longitudinal axis X1 of the device and this facilitates the assembly of the various components of the device.

Furthermore, preferably, still with the aim of facilitating the assembly, all components of the device, and in particular, the first and the second connection element, the ring nut, and the pump, are symmetrical-shaped with respect to a common central symmetry axis X1, and more preferably they have a circular cross-section.

The method for assembling the device according to the invention may be carried out in two different ways.

Both ways provide for firstly stably connecting the second connection element 9 to the neck 1*k* of the container 1. To this end, for example, the second connection element 9 is positioned on the neck 1K of the container and then pushed downwards until the connection means 3 snap-couple with each other. Therefore, according to a first assembly method, the empty bag 5 is associated with the first connection element 4 (abutting the flange 5D of the neck 5A of the bag 5 against the corresponding flange 8E of the body 8 of the first connection element 4) and then the empty bag 5 is inserted into the container 1 and the first connection element 4 is (removably) connected to the second connection element 9 (this situation is shown in FIG. 4C). To this end, for example, the first connection element 4 is positioned on the second connection element 9 and rotated slightly so as to close the connection means 9A 8D (of the bayonet type in the shown example). Then, the bag 5 is filled with a predefined amount of substance to be dispensed. Then, the pump 6 is connected to the bag and to the first connection element, and the ring nut 7 to the first connection element 4, by pushing the ring nut downwards and simultaneously penetrating part of the pump and the floater into the bag, until the connection means 7C, 8F of the ring nut and of the first connection element 4 snap-couple with each other.

The second method for assembling the device according to the invention provides for filling the bag with a predefined amount of the substance to be dispensed outside the container 1, that is when the bag is not inserted into the container 1, and then for inserting the bag into the container 1 when it already contains said predefined amount of substance to be dispensed (as shown in FIG. 7).

Also as outlined hereinafter, this second assembly method allows to reutilise the container 1 and the second connection element 9, after a previous use thereof, and after a bag emptied of the fluid substance together with the relative components associated with the bag (pump 6, ring nut 7 and first connection element 4) has been removed from the container.

According to this second assembly method, associated with the container 1 and with the second connection element 9 is a refilling device 100 (FIG. 7) comprising a bag 105 already filled with a predefined amount of a substance to be dispensed, and a first connection element 104, a ring nut 107, a pump 106 and a member 110 for actuating the pump and dispensing the substance, all identical to those described above. Therefore, the refilling device 100 will not be described in detail hereinafter, and the components thereof will be indicated using the same reference numerals used for the corresponding components described with reference to FIGS. 1, 2, 4, 5, 6, 2, but with addition of 100.

The refilling device 100 is associated with the container 1, by inserting the part 105E of the bag 105, in the cavity 2 of the container 1 until the first connection element 4 abuts against the second connection element 9, and these two elements are connected to each other through respective removable connection means 9A 8D (of the bayonet-like type in the shown example).

In order to facilitate the insertion of the bag 105 filled with the substance to be dispensed, into the seat 2 of the container 1, the volume of this seat is preferably greater than the volume of the part 105E of the bag which is to be inserted into the seat. In the final bag insertion step, the air present in the seat 2 of the container may further flow out, thanks to the fact that the connection between the ring nut 107 and the first connection element 104 is not of the sealed type. Advantageously, also provided for in the ring nut 107 are through holes which allow air exchange between the internal of the container 1 and the external and vice versa, and through the through holes 8V and the interspaces created by the reliefs 8U provided for in the first connection element.

Once the refilling device has been inserted into the container 1, the device thus assembled is entirely identical to the one described above.

Once the fluid substance has been fully dispensed, the bag 5, together with the first connection element 4, the ring nut 7 and the pump 6 can be easily removed from the container 1 (as shown in FIG. 8). For example, to this end the first connection element 4 is slightly rotated so as to open the connection means 9A 8D (of the bayonet-like type in the shown example) and be able to disassociate it from the second connection element 9, by pulling the assembly upwards, stably connected to each other comprising, the emptied bag 5, the first connection element 4, the ring nut 7, the pump 6 and the dispensing and actuation member 10. Once the empty bag and the relative components associated therewith have been removed, the container 1 may be used once again, by associating a refilling device 100 therewith. In this manner, the container can be reused an indefinite number of times, this entailing a definite advantage from an environmental and ecological sustainability point of view.

As shown in FIG. 9A, the refilling device 100 comprises a protection element 116 suitable to protect the part 105V (FIG. 9A) of the bag 105 filled with the substance to be dispensed and which protrudes at the lower part from the first connection element 4. To this end, the element 116 has a height equal to or slightly greater than H5 of this protruding type.

Preferably, in order to facilitate the insertion of the bag 105 into the protection element 106 the latter is open at the lower part, and it is therefore tubular shaped.

Preferably, for recycling purposes, the protection element is made of a paper material, for example comprising at least one paper layer, or it is made of metal for example a tin strip or it is made of plastic material for example recyclable, for example PET-PP-PE. Preferably, the protection element has a thickness S1 comprised between 0.2 mm and 2 mm, more preferably equal to about 1 mm.

As discussed above, the protection element 116 is removably connected to the first connection element 104. To this end, preferably the intermediate annular fissure 108S (FIG. 9C), forms a seat for inserting an upper edge of a protection element 116 (FIG. 9B) having a thickness S1 substantially equal to the transversal dimensions D8 (FIG. 4D) of the fissure 8S of the first connection element 4 so as to forcedly insert this upper edge of the second container 116 thereinto. In this situation, in order to improve the stability of the protection element 116, the part 108T of the first connection element is in contact with the inner face of an upper section of the protection element 116 (as shown in FIG. 9B).

Furthermore, preferably, the maximum transversal dimension D101 (FIG. 9A) of the protection element 116 is smaller than the maximum transversal dimension D108 (FIG. 4A) of the lower part 8K of the connection element 4, so as to facilitate the operations for filling the bag, given that a lower outer edge 108R of the connection element 104 (FIG. 9C, 9B) remains outside the protection element.

To use the refilling device, one has to remove the protection element 116 and therefore insert the refilling device into the container 1, as discussed above.

Therefore, the protection element 116 has the purpose of protecting the bag 105 (generally made of a material with limited thickness, therefore relatively fragile) during storage and transportation of the refilling device, and preferably also during the loading of the bag.

The bag 105 is loaded in a manner similar to the one outlined above. An empty bag 105 is associated with the first connection element 104 as described above, also the protection element is preferably associated with the first connection element 104, and then the first connection element and the bag are associated with a filling station 115 (partially represented in FIG. 9C) having a through hole, into which there is inserted the bag to be filled, delimited by an edge 115A against which the lower edge 108R of the first connection element 104 abuts (as shown in FIG. 9C). As indicated further above, the bag is advantageously protected by the protection element 116 right from the filling step. Therefore, the bag is filled by associating the pump and the ring nut with the bag and with the first connection element, as described above.

Lastly, it should be observed that the embodiments described until now, have been provided by way of non-limiting example and that numerous variants all falling within the same inventive concept may be provided for, same case for example applying to the stable and/or removable connection means described until now which could be different from those shown until now, in any case conventional for the person skilled in the art.

The invention claimed is:

1. A device for containing and dispensing fluid substances, comprising:

a container (1) having an opening (1A) for access to a cavity (2) of the container, and having means (3) for connecting a first connection element (4) removably and at said opening (1A) to said container;

a bag (5) made of a deformable material, suitable to contain a predefined amount of said fluid substances to be dispensed, and comprising:

at least one first part (5E) suitable to be housed in said cavity (2) of the container and in turn delimiting a cavity (5C) suitable to contain said fluid substances to be dispensed, a neck (5A) which departs from an end of said first part (5E) of the bag (5), and which has an opening (5B) for access to said cavity (5C) of said first part (5E) of the bag, a connection part (5F) between said neck and said first part (5E), and a flange (5D) which extends transversely to said neck of the bag at said opening (5B) of the neck;

a pump (6) which can be actuated manually to draw the fluid substance from the bag (5) and supply it to the external, wherein the pump (6) is at least partially housed in the neck (5A);

a ring nut element (7) connected, for example snap-coupled, to said first connection element (4), and suitable to connect said pump (6) and said bag (5) to said first connection element (4);

characterised in that:

the first connection element (4) comprises a body (8) having an upper part (8H) and a lower part (8K) which delimit a tubular through seat (8C) suitable to at least partially house the neck (5A) and at least partially the pump (6), when it is inserted into the neck;

wherein said upper part (8H) comprises an upper opening (8A) delimited by a wall (8E) for resting at least one portion of said flange (5D) of the neck (5A) and connection means (8F, 8G) suitable to cooperate with counter connection means (7B, 7C) provided for in the ring nut element (7) for stably constraining said first connection element (4) and said ring nut element (7) to each other so that said ring nut element (7): when it is connected to the first connection element (4) and to the pump (6), it constrains also said first connection element (4) and said at least one portion of said flange (5D) to each other; and so that when said first connection element (4) is released from the container (1), the bag remains stably associated with the assembly formed by the first connection element (4), by the ring nut element (7), and by the pump (6);

that the lower part (8K) of the first connection element (4), comprises a lower opening (8B) and counter connection means (8D), suitable to cooperate with the connection means (3) provided for at the access opening (1A) of the container (1) to removably connect said body (8) of the first connection element (4) to said container;

and that a transversal dimension (D1) of the opening (1A) of the container is greater than or equal to a maximum transversal dimension (D7) of the bag (5) so as to allow to insert the at least first part (5E) of the bag (5) into said container (1) when said first part (5E) of the bag contains the predefined amount of said fluid substances to be dispensed and then allow to connect the first connection element (4) to the container (1), or vice versa to allow to remove said first part (5E) of the bag from the container (1) once it has been emptied of the substance to be dispensed and once the first connection element (4) has been disconnected from the container (1), wherein both when inserting said first part (5E) of the bag into the container (1) and when removing said first part (5E) of the bag (5) from the container (1), at least said bag (5), said ring nut element (7) and said pump (6) remain stably constrained to said first connection element (4).

2. The device for containing and dispensing fluid substances according to claim 1, characterised in that the upper opening (8A) of the upper part (8H) and the lower opening (8B) of the lower part (8K) of the first connection element (4) have respective maximum transversal dimensions (D3) and (D4) different from each other with the upper opening (8A) having smaller maximum transversal dimensions (D3) with respect to the maximum transversal dimensions (D4) of the lower opening (8B).

3. The device for containing and dispensing fluid substances according to claim 1, characterised in that the means (3) for removably connecting the first connection element (4) to said container 1 at said opening (1A) of the container (1) comprise a second connection element (9), having first connection members (9A) suitable to cooperate with counter connection members (1C) provided for at the opening (1A) of the container (1), suitable to mutually stably connect this second connection element to an upper edge of the container (1), and second connection members (9K) suitable to cooperate with counter connection members (8L) of the body (8) of the first connection element (4), to removably connect the first connection element (4) to the second connection element (9) and to the container (1).

4. The device for containing and dispensing fluid substances according to claim 1, characterised in that: the lower part (8K) of the first connection element (4), comprises connection means (8S) for removably connecting a protection element (116) suitable to protect a part (105V) of the bag (105) filled with the substance to be dispensed and which projects downward from the lower part from the first connection element (4) when said first connection element (4) and said bag are not associated with said container (1), wherein the connection means (8S) for removably connecting the protection element (116) are provided for in proximity of the counter connection means (8D) for removably connecting the first connection element 4 to the container (1).

5. The device for containing and dispensing fluid substances according to claim 4 characterised in that outside the connection means (8S) for removably connecting the protection element (116), the lower part (8K) of the first connection element (4) comprises an abutment surface (8R) suitable to cooperate with a counter abutment surface (9E) of the second connection element (9) or with a rest surface (115A) of a station (115) for filling the bags.

6. The device for containing and dispensing fluid substances according to claim 1, characterised in that: the lower part (8K) of the first connection element (4), comprises a tubular wall (8T) sized so as to come into contact with at least one portion (T1) of the bag (5) when the bag is associated with the first connection element (4), so as to stabilise the position of the bag (5), wherein said portion (T1) of the bag comprises a part of the bag immediately below the connection part (5F) of the bag for connection with the neck (5A).

7. The device for containing and dispensing fluid substances according to claim 1, characterised in that the lower part (8K) of the first connection element (4) comprises a tubular wall (8T) suitable to come into contact with an inner wall of the second connection element (9) or with an inner wall of a neck (1K) of the container and the lower part (8K) has along an outer face thereof a plurality of vertical reliefs (8U) which are suitable to allow the external air to enter into the space (S5) which is created between an outer face of the bag (5) and an inner face of the container (1).

8. The device for containing and dispensing fluid substances according to claim 1, characterised in that the connection means (8F, 8G) of the first connection element (4) comprises:

first connection means (8F) suitable to cooperate with a first portion of the counter connection means (7C) provided for in the ring nut element (7), which axially stably constrain the first connection element (4) and the ring nut element (7) to each other, and comprise, at an outer face of the tubular wall of the upper part (8H) of the body (8), a step (8J) suitable to snap-cooperate with a corresponding step (7J) of the ring nut element (7), provided for in an inner face (7B) of the tubular body (7A) of the ring nut and at a lower opening (7F) of the tubular body (7A); wherein said steps (8J) and (7J) are conformed so that by pushing the ring nut element coaxially and downwards along the connection element (4) the two steps are coupled to each other stably constraining these two components and preventing mutual axial movements; and second connection means (8G) suitable to cooperate with a second portion of the counter connection means (7B) provided for in the ring nut element (7), suitable to connect the first connection element (4) and the ring nut element (7) to each other, preventing mutual rotations, and comprise at the outer face of the tubular wall of the upper part (8H) of the body (8), a gear tooth (8Q) suitable to cooperate with a corresponding counter gear tooth (7L) of then ring nut element (7), provided for in the inner face (7B) of the tubular body (7A) of the ring nut, said gear tooth (8Q) and said counter gear tooth (7L) being conformed so that by pushing the ring nut coaxially and downwards along the first connection element (4) the two gear teeth mutually mesh stably constraining these two components and preventing mutual rotations.

9. A method for assembling a device for containing and dispensing fluid substances comprising a refilling device (100) for refilling a container (1) having an opening (1A) for access to a cavity (2) of the container, and having means (3) for removably connecting a first connection element (104) of said refilling device at said opening (1A) to said container;

wherein said refilling device comprises:

a bag (105) made of a deformable material, filled with a predefined amount of said fluid substances to be dispensed, and comprising: at least one first part (105E) filled with said substance to be dispensed and suitable to be housed in said cavity (2) of the container and in turn delimiting a cavity (105C) suitable to contain said fluid substances to be dispensed, a neck (105A) which departs from an end of said first part (105E) of the bag (105), and which has an opening (105B) for access to said cavity (105C) of said first part (105E) of the bag, a connection part (5F) between the neck (105A) and said first part (105E), and a flange (105D) which extends transversely to the neck at said opening (105B);

a pump (106) which can be actuated manually to draw the fluid substance from the bag (105) and supply it to the external, wherein the pump (106) is at least partially housed in the neck (105A);

a ring nut element (107) connected, for example snap-coupled, to said first connection element (104), and suitable to connect said pump (106) and said bag (105) to said first connection element (104);

wherein the first connection element (104) comprises a body (108) having an upper part (108H) and a lower part (108K) which delimit a tubular through seat (108C) suitable to at least partially house the neck (105A) and at least partially the pump (106), when it is inserted into the neck;

wherein said upper part (108H) comprises: an upper opening (108A) delimited by a wall (108E) for resting at least one portion of said flange (105D) of the neck (105A) and connection means (108F) (108G) suitable to cooperate with counter connection means (107B), (107C) provided for in the ring nut element (107) for stably constraining said first connection element (104) and said ring nut element (107) to each other, so that said ring nut element (107): when it is connected to the first connection element (104) and to the pump (106), it constrains also said first connection element (104) and said at least one portion of said flange (105D) to each other; and so that when said first connection element (104) is released from the container (1), the bag remains stably associated with the refilling device and with the assembly formed by the first connection element (104), by the ring nut element (107), and by the pump (106);

that the lower part (108K) of the first connection element (104), comprises a lower opening (108B) and counter connection means (108D), suitable to cooperate with the connection means (103) provided for at the access opening (1A) of the container (1) to removably connect said body (108) of the first connection element (104) to said container;

wherein a transversal dimension (D1) of the opening (1A) of the container is greater than or equal to a maximum transversal dimension (D7) of the bag (105) when the bag is filled with the predefined amount of substance to be dispensed, said method comprising:

filling the bag (105) with a predefined amount of the substance to be dispensed, outside the container (1), when the bag is not inserted into the container (1), then inserting the bag into the container (1) when it already contains said predefined amount of substance to be dispensed and when it is also already stably connected to said first connection element (104), said ring nut element (107) and said pump (106).

10. The method according to claim 9 further comprising the steps of:

removably connecting a protection element (116), suitable to protect the bag (105) to the first connection element (104), and removing the protection element (116) before inserting the bag into the container (1), wherein the protection element (116) is associated with the connection element (4) before filling the bag.

11. A device for containing and dispensing fluid substances, comprising:

a container (1) having an opening (1A) for access to a cavity (2) of the container, and having a first connector (3) for connecting a first connection element (4) removably and at said opening (1A) to said container;

a bag (5) made of a deformable material, suitable to contain a predefined amount of said fluid substances to be dispensed, and comprising: at least one first part (5E) suitable to be housed in said cavity (2) of the container and in turn delimiting a cavity (5C) suitable to contain said fluid substances to be dispensed, a neck (5A) which departs from an end of said first part (5E) of the bag (5), and which has an opening (5B) for access to said cavity (5C) of said first part (5E) of the bag, a connection part (5F) between said neck and said first part (5E), and a flange (5D) which extends transversely to the neck at said opening (5B);

a pump (6) which can be actuated manually to draw the fluid substance from the bag (5) and supply it to the external, wherein the pump (6) is at least partially housed in the neck (5A);

a ring nut (7) connected to said first connection element (4), and suitable to connect said pump (6) and said bag (5) to said first connection element (4);

characterised in that:

the first connection element (4) comprises a body (8) having an upper part (8H) and a lower part (8K) which delimit a tubular through seat (8C) suitable to at least partially house the neck (5A) and at least partially the pump (6), when it is inserted into the neck;

wherein said upper part (8H) comprises an upper opening (8A) delimited by a wall (8E) for resting at least one portion of said flange (5D) of the neck (5A) and a second connector (8F, 8G) suitable to cooperate with a first counter connector (7B, 7C) provided for in the ring nut (7) for stably constraining said first connection element (4) and said ring nut (7) to each other so that said ring nut (7): when it is connected to the first connection element (4) and to the pump (6), it constrains also said first connection element (4) and said at least one portion of said flange (5D) to each other; and so that when said first connection element (4) is released from the container (1), the bag remains stably associated with the assembly formed by the first connection element (4), by the ring nut (7), and by the pump (6);

that the lower part (8K) of the first connection element (4), comprises a lower opening (8B) and a second counter connector (8D), suitable to cooperate with the first connector (3) provided for at the access opening (1A) of the container (1) to removably connect said body (8) of the first connection element (4) to said container;

and that a transversal dimension (D1) of the opening (1A) of the container is greater than or equal to a maximum transversal dimension (D7) of the bag (5) so as to allow to insert the at least first part (5E) of the bag (5) into said container (1) when said first part (5E) of the bag contains the predefined amount of said fluid substances to be dispensed and then allow to connect the first connection element (4) to the container (1), or vice versa to allow to remove said first part (5E) of the bag from the container (1) once it has been emptied of the substance to be dispensed and once the first connection element (4) has been disconnected from the container (1), wherein both when inserting said first part (5E) of the bag into the container (1) and when removing said first part (5E) of the bag (5) from the container (1), at least said bag (5), said ring nut (7) and said pump (6) remain stably constrained to said first connection element (4).

12. A method for assembling a device for containing and dispensing fluid substances according to claim 11, comprising:

filling the bag (105) with a predefined amount of the substance to be dispensed, outside the container (1), when the bag is not inserted into the container (1), then inserting the bag into the container (1) when the bag already contains said predefined amount of substance to be dispensed and when the bag is also already stably connected to said first connection element (104), said ring nut (107) and said pump (106).

* * * * *